(12) United States Patent
Morihara

(10) Patent No.: US 7,275,782 B2
(45) Date of Patent: Oct. 2, 2007

(54) WEATHER STRIP FOR FOLDING TOP

(75) Inventor: Yasuhiro Morihara, Hiroshima-ken (JP)

(73) Assignee: Nishikawa Rubber Co., Ltd., Hiroshima-shi (JP)

( * ) Notice: Subject to any disclaimer, the term of this patent is extended or adjusted under 35 U.S.C. 154(b) by 174 days.

(21) Appl. No.: 11/000,311

(22) Filed: Nov. 30, 2004

(65) Prior Publication Data

US 2005/0200157 A1 Sep. 15, 2005

(30) Foreign Application Priority Data

Mar. 10, 2004 (JP) ............................. 2004-066533

(51) Int. Cl.
*E06B 7/16* (2006.01)

(52) U.S. Cl. ................. 296/107.04; 296/1.35; 296/146.3; 296/146.9; 296/93; 49/495.1; 49/475.1

(58) Field of Classification Search ........... 296/107.04, 296/1.35, 93, 146.3, 146.9; 49/495.1, 475.1
See application file for complete search history.

(56) References Cited

U.S. PATENT DOCUMENTS 6,010,177 A * 1/2000 Fujita et al. ............ 296/107.04
6,189,950 B1 * 2/2001 Kawazoe et al. ...... 296/107.04

* cited by examiner

*Primary Examiner*—Joseph D. Pape
(74) *Attorney, Agent, or Firm*—Flynn, Thiel, Boutell & Tanis, P.C.

(57) ABSTRACT

There is provided a weather strip for a folding top of an open car installed in a divided manner both sides thereof in the proximity of divided rails. Each divided member comprises a hollow seal portion and a seal lip portion comprised for resilient contacts with a door glass. Each divided member comprises a die mold part in a front and a rear end portion. The seal lip portion of each divided member comprises a thick part. The thick part is formed thicker than a thin part. The thick part is provided with a thickness for a front end surface and a rear end surface of adjoining seal lip portions that are located next to each other to make a resilient contact with each other even if the seal lip portion is deformed in the folding top when the folding top is in a closed position.

4 Claims, 3 Drawing Sheets

WEATHER STRIP FOR FOLDING TOP

BACKGROUND OF THE INVENTION

This invention relates to a weather strip installed in a divided manner to both a left side and a right side of a folding top of an open car.

Referring to FIGS. 1 to 3, a prior art relating to the invention will be described. There has conventionally been an open car comprising a folding top 1 on the roof. This folding top 1 is provided with a plural number of divided rails 2 both in the left side and the right side of the open car, as well as a weather strip 20 which is also divided into a plural number of divided members 21, and each member is installed to a corresponding divided rail 2.

In this prior art, the weather strip 20 forms a roughly straight line where a front end surface 22a of a die mold part 50, formed in a front end portion and a rear end portion of each divided member 21, and a rear end surface 22b of an adjoining die mold part 50 make a resilient contact with each other when the folding top 1 is in a closed position.

This weather strip 20 comprises a hollow seal portion 12 which makes a resilient contact with an upper end portion of a door glass 3 to provide a sealing performance. Further, there is another type of weather strip which comprises a seal lip portion 22 besides the hollow seal portion 12, which also makes a resilient contact with the door glass 3.

The conventional weather strip 20 comprising the seal lip portion 22 besides the hollow seal portion 12 is superior in the sealing performance compared to the former one which comprises only the hollow seal portion 12 for a resilient contact with the door glass 3, since two members are comprised for the contact with the door glass 3.

However, according to this conventional weather strip 20, although both the front end and the rear end portions thereof are provided with a certain degree of hardness by forming them with die mold parts 50, 50, the seal lip portion 22 is formed in a lip shape, so that the seal lip portion 22 consequently lacks hardness and is easily deformed. Therefore, when the folding top 1 is in a closed position, adjoining seal lip portions 22, 22 that are located next to each other overlap with each other if the seal lip portion 22 is deformed, so that the front end portion and the rear end portion of the adjoining seal lip portions 22, 22 cannot make a resilient contact tightly. As a result, there arises a problem that rain water or washing water invades into an inside of an automobile through the unsuccessfully contacted area.

SUMMARY OF THE INVENTION

The present invention is made in the light of such problem, and therefore, it is an object of this invention to provide a weather strip for a folding top of an open car which is installed to both a left and a right side of a roof, and which comprises a hollow seal portion and a seal lip portion for enabling resilient contact with a door glass, in which adjoining seal lip portions can make a resilient contact tightly with each other to prevent water, e.g., rain water, from invading into an inside of an automobile, if the seal lip portion is deformed in a folding top when the folding top is in a closed position.

Referring to FIGS. 4 and 5, a weather strip according to the invention will be described hereinafter.

According to the first aspect of the invention, there is provided a weather strip for a folding top of an open car installed in a divided manner both to a left and a right side of the folding top 1 in the proximity of a plural number of divided rails 2. Each divided member 11 comprises a hollow seal portion 12 and a seal lip portion 13 which are comprised for enabling resilient contact with a door glass. Each divided member 11 comprises a die mold part 50 in a front end portion and a rear end portion thereof. The seal lip portion 13 of each divided member 11 comprises a thick part 14 of the front end portion and the rear end portion thereof. The thick part 14 is formed thicker than a thin part 15 of the seal lip portion 13. The thick part 14 is provided with a certain thickness which enables the front end surface 13a and the rear end surface 13b of the adjoining seal lip portions 13, 13 to successfully make a resilient contact tightly with each other even if the seal lip portion 22 is deformed in the folding top 1 when the folding top 1 is in a closed position.

According to the second aspect of the invention, there is provided a weather strip for a folding top of an open car introduced in the first aspect of the invention, wherein the seal lip portion 13 comprises inclined planes 30 of the front end surface 13a and the rear end surface 13b, which are fitted with each other, for enabling a resilient contact so that the broader surfaces of the front end and the rear end can be made a contact to each other.

According to the third aspect of the invention, there is provided a weather strip for a folding top of an open car introduced in the first aspect of the invention, wherein the thick part 14 of the seal lip portion 13 comprises a thin part 15 and an additional part 16. The additional part 16 is formed on an inner side surface of the thin part 15 of the seal lip portion 13.

According to the fourth aspect of the invention, there is provided a weather strip for a folding top of an open car introduced in the second aspect of the invention, wherein the thick part 14 of the seal lip portion 13 comprises a thin part 15 and an additional part 16. The additional portion 16 is formed on an inner side surface of the thin part 15 of the seal lip portion 13.

According to the first aspect of the invention, the seal lip portion 13 of each divided member 11 comprises the thick part 14 in the front end and the rear end portions, and each of which is formed thicker than the thin part 15 of the seal lip portion 13. Further, the thick part 14 is provided with a certain thickness which enables the front end surface 13a and the rear end surface 13b of the adjoining seal lip portions 13, 13 to make a resilient contact tightly with each other even if the seal lip portion 22 is deformed in the folding top 1 when the folding top 1 is in a closed position. Therefore, the weather strip 10 can surely prevent water, e.g., rain water, from invading into an inside of an automobile.

That is, when there occurs a change in the folding top 1 when it is in a closed position, the seal lip portion 13 of each divided member 11 comprises the thick part 14 in both the front end and the rear end portions thereof, so that the adjoining seal lip portions 13, 13 can assuredly make a resilient contact with each other without overlapping. Therefore, the weather strip 10 is able to provide an excellent sealing performance in the contacting area of the seal lip portions 13, 13, like a contacting area of the hollow seal portions 12, 12, and thus it can assuredly prevent an invasion of water.

According to the second aspect of the invention, the contacting area of the adjoining seal lip portions 13, 13 is able to provide an excellent sealing performance equivalent to the first aspect of the invention.

Further, the inclined plane 30 is provided in the front end surface 13a and the rear end surface 13b of the seal lip portion 13 in order to make a resilient contact in a broader range compared to the perpendicular surface, so that there can be provided a broader contacting area between them, and that the sealing performance of the contacting area can be further improved.

According to the third and the fourth aspects of the invention, the contacting area between the front end surface 13a and the rear end surface 13b of the seal lip portion 13 can provide an excellent sealing performance similar to the first and the second aspects of the invention.

Further, the thick part 14 of the seal lip portion 13 is formed by providing the additional part 16 on the inner side of the thin part 15, so that the additional part 16 is not visualized from an outside. Therefore, an external appearance of the seal lip portion 16 can be provided with a smooth surface without forming an unevenness, providing an excellent external appearance.

DETAILED DESCRIPTION OF THE INVENTION

Figure 1:
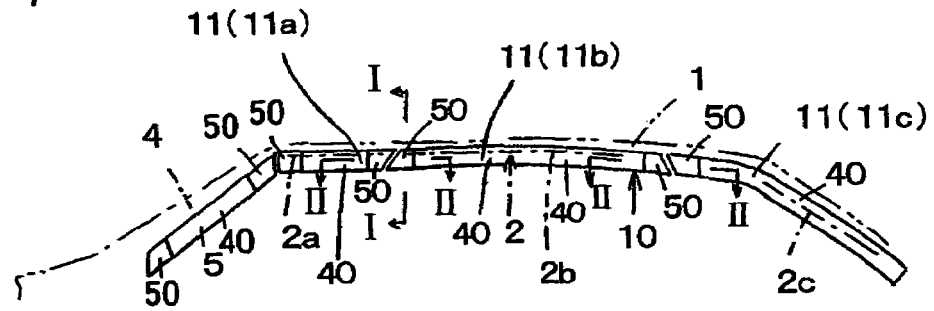
FIG. 1 is a side elevation view showing an open car comprising a weather strip for a folding top.
Figure 1:
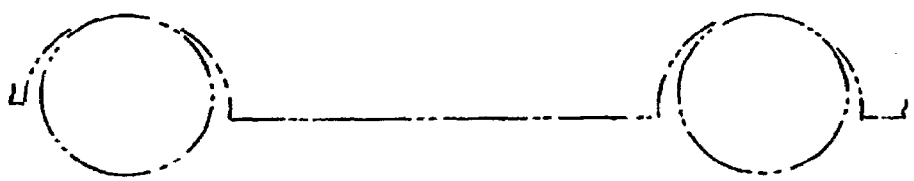
Figure 2:
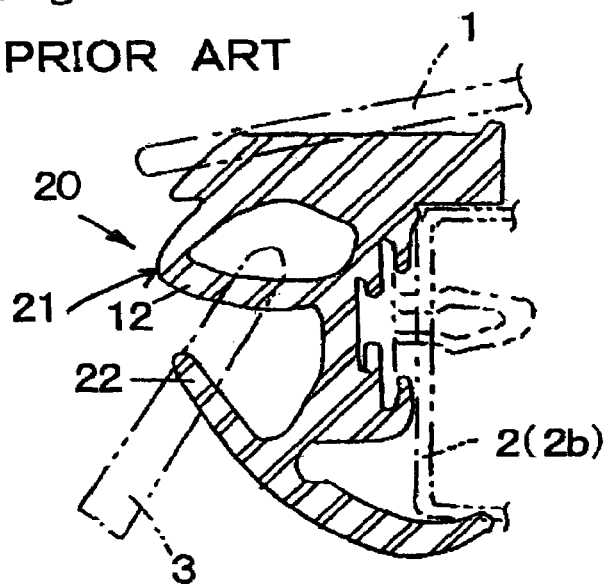
FIG. 2 is a sectional view along line I—I in FIG. 1 showing a weather strip according to a prior art.
Figure 3:
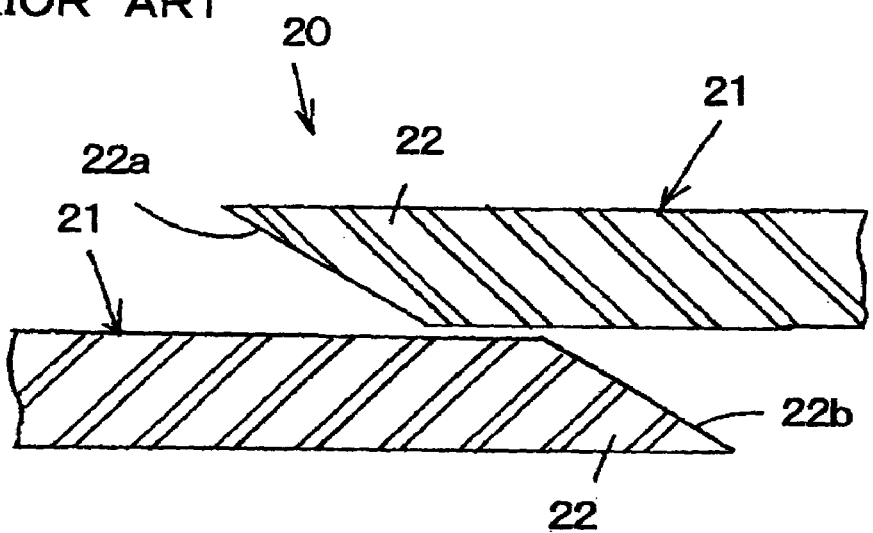
FIG. 3 is a sectional view along line II—II in FIG. 1 showing a weather strip according to a prior art.
Figure 4:
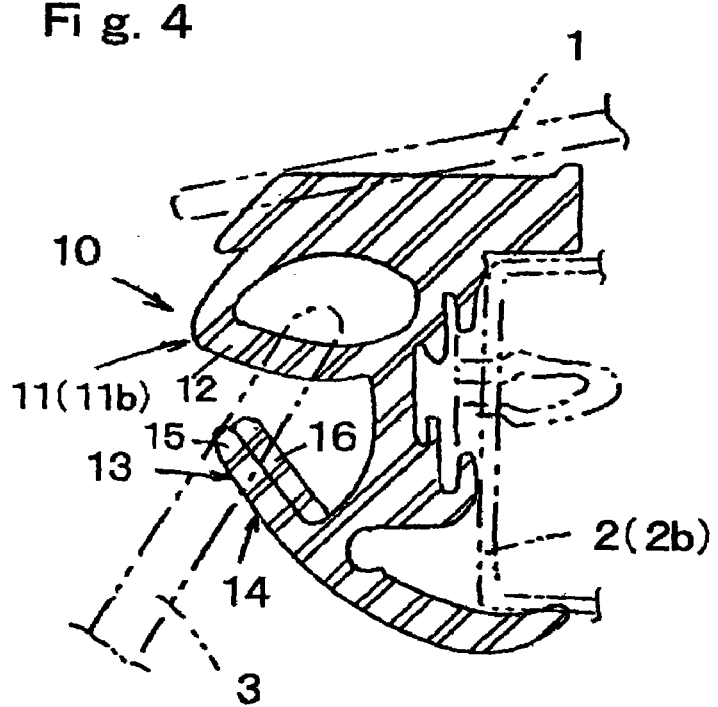
FIG. 4 is a sectional view along line I—I in FIG. 1 showing a weather strip according to the invention.
Figure 5:
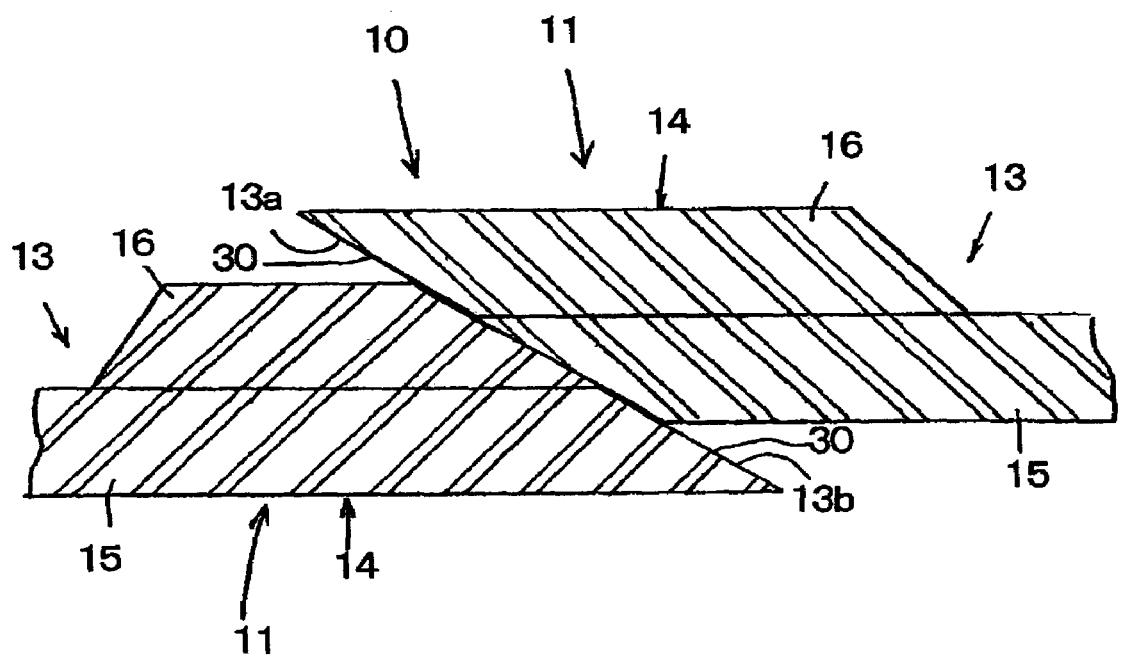
FIG. 5 is a sectional view along line II—II in FIG. 1 showing a weather strip according to the invention.

A weather strip for a folding top of an open car according to a preferred embodiment of the invention is illustrated in FIGS. 1, 4 and 5. This weather strip 10 is installed in a divided manner both to a left and a right side of a folding top 1 of an open car, forming divided members 11, in a proximity of a plural number of rails 2a, 2b, 2c forming a rail 2, which are also structured in a divided manner. Each divided member 11 of the weather strip 10 comprises a hollow seal portion 12 and a seal lip portion 13 as well as a die mold part 50 which is comprised in a front end and a rear end portion thereof. The die mold part 50 is continuously connected to an extrusion mold part 40.

The rail 2 is divided into a front rail 2a, a center rail 2b and a rear rail 2c. The first divided member 11a of the weather strip 10 is installed to the front rail 2a, while the second divided member 11b is installed to the center rail 2b, and the third divided member 11c is installed to the rear rail 2c, respectively.

Each of the divided members 2a, 2b and 2c of the rail 2 and each of the divided members 11a, 11b and 11c of the weather strip 10 forms a roughly straight line without overlapping the front end and the rear end portions of each member when the folding top 1 is in a closed position. Further, when the folding top 1 is in an open position, the folding top 1 is stored in a back side of the open car in a folded manner.

According to the weather strip 10 in the preferred embodiment of the invention, the seal lip portion 13 of each divided member 11 is provided with a thick part 14 in both the front end and the rear end portions thereof, which is structured thicker than a thin part 15. A thickness of the thick part 14 is formed such that a front end surface 13a and a rear end surface 13b of adjoining seal lip portions 13, 13 can safely make a resilient contact tightly even if the seal lip portion 22 is deformed in the fold top 1 when the fold top 1 is in a closed position. It should be noted that the range of the change in the folding top 1 can be calculated in advance.

Therefore, if the seal lip portion 22 is deformed in the fold top 1 when the folding top 1 is in a closed position, the front end surface 13a and the rear end surface 13b of the adjoining seal lip portions 13, 13 can assuredly make a resilient contact and provide a sufficient sealing performance, though the contacting position of the surfaces 13a, 13b may slightly move from its proper position. As a result, water such as rain can be prevented from invading into an inside of the open car through the contacting area of the adjoining seal lip portions 13, 13.

Further, according to this embodiment, there is formed an inclined plane 30 in the front end surface 13a and the rear end surface 13b of the seal lip 13, which are fitted in order to successfully contact the surfaces 13a, 13b in a broader range. Therefore, a contacting area of the front end surface 13a and the rear end surface 13b can be broadened, and thus the invasion of the water is further prevented.

Moreover, according to this embodiment, the thick part 14 of the seal lip portion 13 is formed by providing an additional part 16 on an inner side surface of a thin part 15 of the seal lip portion 13. With such structure, the outer surface of the seal lip portion 13 forms a smooth surface, so that the weather strip 10 is improved in the sealing performance without impairing an appearance thereof.

In this preferred embodiment, the front end surface 13a of the seal lip portion 13 of the divided member 11 is resiliently contacted with the rear end surface 13b of a roof weather strip 5 installed to a front roof 4 in order to provide a good sealing performance in that contacting area as well.

It should be noted that although the weather strip 10 in this preferred embodiment is composed of three divided members 11a, 11b, 11c, the invention is not limited to such construction, and it can be comprised of two or less, or four or more divided members.

The disclosure of Japanese Patent Application No. 2004-066533 filed Mar. 10, 2004 including specification, claims, and drawings, is incorporated herein by reference.

What is claimed is:

1. A weather strip for a folding top of an open car installed in a divided manner at both a left and a right side of said folding top in the proximity of a plural number of divided members, wherein, each divided member comprises a hollow seal portion and a seal lip portion formed for enabling resilient contact with a door glass;

each divided member comprises a die mold part at a front end portion and a rear end portion thereof;

said seal lip portion of each divided member comprises a thick part at the front end portion and rear end portion thereof;

said thick part is formed thicker than a thin part of said seal lip portion; and said thick portion is provided with a thickness enabling a front end surface and a rear end surface of adjoining seal lip portions that are located next to each other to make a tightly resilient contact with each other, if said seal lip portion is deformed in said folding top when said folding top is in a closed position.

2. A weather strip for a folding top of an open car as claimed in claim 1, wherein said seal lip portion comprises parallel inclined planes in said front end and said rear end surfaces which are fitted with each other, so that the broader surfaces of the front end and the rear end can be made to contact with each other.

3. A weather strip for a folding top of an open car as claimed in claim 1, wherein said thick portion of said seal lip portion comprises a thin part and an additional part; and said additional part is formed on an inner side surface of said thin part of said seal lip portion.

4. A weather strip for a folding top of an open car as claimed in claim 2, wherein said thick part of said seal lip portion comprises a thin part and an additional part; and said additional part is formed on an inner side surface of said thin part of said seal lip portion.

* * * * *